(12) United States Patent
Wilson et al.

(10) Patent No.: US 11,279,286 B2
(45) Date of Patent: Mar. 22, 2022

(54) ACTUATOR ASSEMBLY FOR MIRROR

(71) Applicant: MOTHERSON INNOVATIONS COMPANY LIMITED, London (GB)

(72) Inventors: Douglas James Wilson, Fort Gratiot, MI (US); Kenneth Gira, Saint Clair, MI (US)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/848,872

(22) Filed: Apr. 15, 2020

(65) Prior Publication Data

US 2021/0323474 A1  Oct. 21, 2021

(51) Int. Cl.
*B60R 1/07* (2006.01)
*F16H 25/20* (2006.01)

(52) U.S. Cl.
CPC .............. *B60R 1/07* (2013.01); *F16H 25/20* (2013.01); *F16H 2025/2075* (2013.01); *F16H 2025/2087* (2013.01)

(58) Field of Classification Search
CPC ........................ B60R 1/07; F16H 25/20; F16H 2025/2075; F16H 2025/2087
See application file for complete search history.

(56) References Cited

U.S. PATENT DOCUMENTS

| | | | | |
|---|---|---|---|---|
| 4,940,322 A * | 7/1990 | Hamamoto | ............... | B60R 1/07 307/10.1 |
| 4,986,646 A * | 1/1991 | Hamamoto | ............... | B60R 1/07 318/466 |
| 5,033,835 A * | 7/1991 | Platzer, Jr. | .............. | B60R 1/025 359/877 |
| 5,305,144 A * | 4/1994 | Mori | ..................... | B60R 1/0602 15/250.3 |
| 5,703,732 A * | 12/1997 | Boddy | .................... | B60R 1/074 359/841 |
| 5,993,018 A * | 11/1999 | Hattori | ..................... | G01B 7/30 359/877 |
| 6,019,475 A * | 2/2000 | Lynam | .................. | B60R 1/0602 359/604 |
| 6,093,976 A * | 7/2000 | Kramer | .................... | B60R 1/02 307/10.1 |
| 6,474,822 B2 * | 11/2002 | Swindon | ................. | B60R 1/072 359/871 |

(Continued)

FOREIGN PATENT DOCUMENTS

WO WO 2003/022635 A1  3/2003
WO WO 2005/073038 A1  8/2005

*Primary Examiner* — David M Fenstermacher
(74) *Attorney, Agent, or Firm* — Jones Day

(57) ABSTRACT

The present disclosure provides an actuator assembly for a mirror head. The actuator includes a tubular member, an inner carriage, an outer carriage, a helix drive shaft and a motor drive. The inner carriage includes one or more inner magnets. The outer carriage is coupled to the mirror head. The outer carriage includes one or more outer magnets magnetically coupled to the one or more inner magnets of the inner carriage. The helix drive shaft is drivably coupled to the inner carriage. The motor drive is configured to rotate the helix drive shaft relative to the tubular member. Upon rotation of the helix drive shaft by the motor drive, the inner carriage translates. The outer carriage also translates along with the inner carriage due to magnetic coupling between the one or more inner magnets and the one or more outer magnets.

20 Claims, 5 Drawing Sheets

(56) References Cited

U.S. PATENT DOCUMENTS

| | | | | |
|---|---|---|---|---|
| 6,672,731 | B2* | 1/2004 | Schnell | B60R 1/025 359/873 |
| 6,698,905 | B1* | 3/2004 | Whitehead | B60R 1/04 359/604 |
| 6,960,895 | B2* | 11/2005 | Makaran | H02K 11/02 318/245 |
| 7,008,067 | B2* | 3/2006 | Hsu | B60R 1/074 248/466 |
| 7,009,498 | B2* | 3/2006 | Lang | B60R 1/12 340/12.22 |
| 7,137,717 | B2* | 11/2006 | Ohashi | B60R 1/072 359/877 |
| 7,270,433 | B2* | 9/2007 | Danek | B60R 1/07 307/10.1 |
| 7,585,082 | B2* | 9/2009 | Yamada | G01D 5/145 359/872 |
| 7,722,200 | B2* | 5/2010 | Iwasaki | B60R 1/07 359/843 |
| 7,759,892 | B2* | 7/2010 | Sho | B60R 1/07 318/467 |
| 8,106,614 | B2* | 1/2012 | Niesing | B60R 1/07 318/434 |
| 8,783,883 | B2* | 7/2014 | Tobin | B60R 1/072 359/877 |
| 11,009,878 | B2* | 5/2021 | Matsuzawa | G05D 1/02 |
| 2015/0097743 | A1* | 4/2015 | Evans | H01Q 3/20 343/754 |
| 2020/0049243 | A1* | 2/2020 | Mallmann | F16H 25/2454 |
| 2020/0148118 | A1* | 5/2020 | Brouwer | B60R 1/072 |
| 2020/0170186 | A1* | 6/2020 | Curtis | F16H 25/20 |
| 2021/0323474 | A1* | 10/2021 | Wilson | F16H 25/20 |
| 2021/0332873 | A1* | 10/2021 | Blesener | G08C 17/02 |
| 2021/0380040 | A1* | 12/2021 | Kondo | B60R 1/07 |
| 2021/0388885 | A1* | 12/2021 | Takizawa | F16H 1/32 |

* cited by examiner

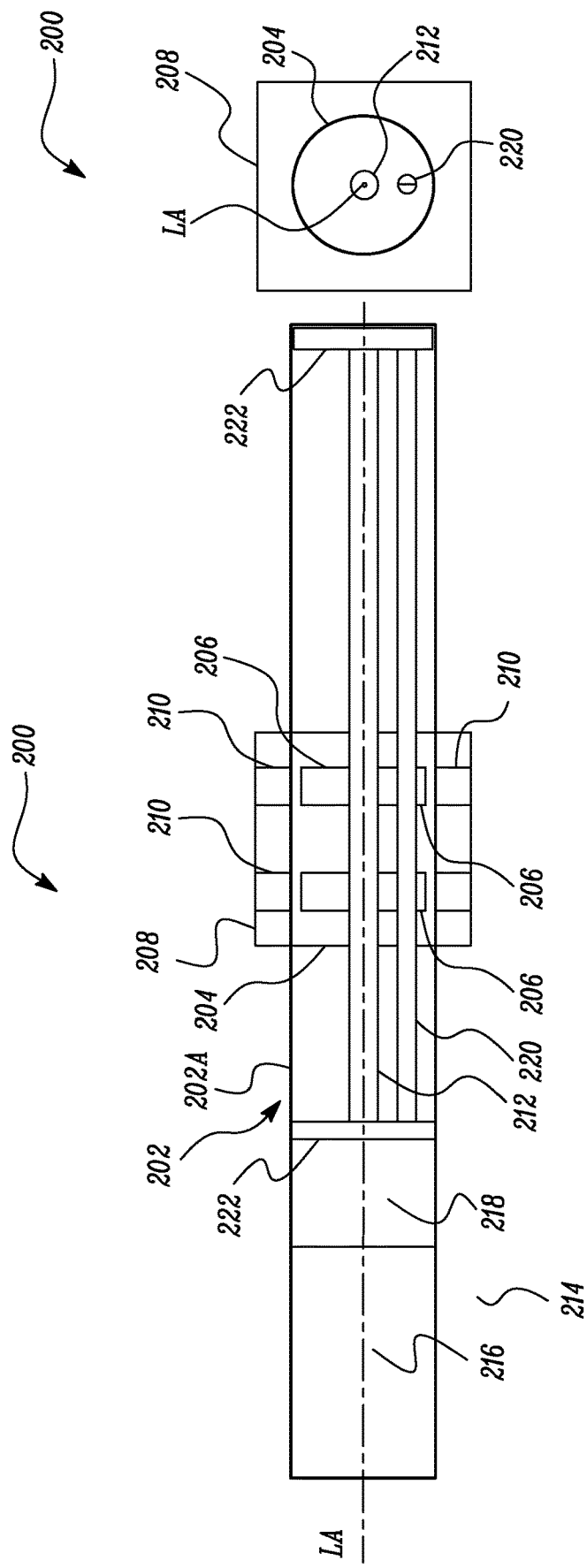

ACTUATOR ASSEMBLY FOR MIRROR

TECHNICAL FIELD

The present disclosure relates generally to a mirror system, and more specifically to an actuator assembly for a mirror system.

BACKGROUND

Vehicles typically include one or more external rearview mirrors. Such external rearview mirrors are generally adapted to be adjusted to different locations by telescoping powered action of the mirror. Actuators for current power extend mirrors typically use a motor and gear set, along with an over-ride clutch mechanism, designed to accomplish both the electrical and manual telescoping action of the mirror. As most of the actuator components are generally located too far outboard in a mirror head, centre of gravity of the mirror is also positioned too far outboard which consequently may prove detrimental to the ride quality of the mirror. Another method of powering the telescoping action of the mirror uses a helix drive mechanism. However, conventional helix drives cannot be manually overridden. Some helix drives include some type of clutch or slip-nut mechanism to achieve manual operation. However, these types of clutch mechanisms may be exposed to the environment. As a result, the helix drives may have a poor durability because of ingress of dirt and debris into the helix mechanism.

Additionally, conventional telescoping mirrors may require substantial manual telescoping adjustment efforts. Manual telescoping adjustment efforts may exceed normal ergonomic limits. Further, conventional electric powered telescoping mirrors may have adverse effects on attributes like actuator motor noise, gear whine, transverse speed, excessive over-ride forces etc. In some telescoping mirrors, there is less structural support for the mirror head that may cause mirror glass to vibrate.

SUMMARY OF THE DISCLOSURE

In one aspect, the present disclosure provides an actuator assembly for a mirror head. The actuator includes a tubular member, an inner carriage, an outer carriage, a helix drive shaft and a motor drive. The tubular member defines a longitudinal axis along its length. The inner carriage is slidably received within the tubular member. The inner carriage includes one or more inner magnets. The outer carriage is movably received on an outer surface of the tubular member. The outer carriage is coupled to the mirror head. The outer carriage is movable along the longitudinal axis relative to the tubular member. The outer carriage includes one or more outer magnets magnetically coupled to the one or more inner magnets of the inner carriage. The helix drive shaft is received within the tubular member. The helix drive shaft is drivably coupled to the inner carriage. The helix drive shaft is configured to translate the inner carriage along the longitudinal axis relative to the tubular member. The motor drive is at least partially received within the tubular member. The motor drive is drivably coupled to the helix drive shaft and is configured to rotate the helix drive shaft relative to the tubular member. Upon rotation of the helix drive shaft by the motor drive, the inner carriage translates along the longitudinal axis. As a result, the outer carriage also translates along with the inner carriage along the longitudinal axis due to magnetic coupling between the one or more inner magnets and the one or more outer magnets.

In an example, the actuator assembly further includes an anti-rotation feature coupled to the inner carriage to prevent rotation of the inner carriage relative to the tubular member.

In an example, the tubular member has a circular cross-section.

In an example, the tubular member has a non-circular cross-section to prevent rotation of the inner carriage relative to the tubular member.

In an example, each of the one or more inner magnets includes a neodymium magnet or a samarium-cobalt magnet.

In an example, each of the one or more outer magnets includes a neodymium magnet or a samarium-cobalt magnet.

In an example, the one or more inner magnets include a pair of inner magnets. The one or more outer magnets include a pair of outer magnets. Furthermore, each of the pair of inner magnets is magnetically coupled to a corresponding outer magnet from the pair of outer magnets.

In an example, the actuator assembly further includes a pair of support members that rotatably support the helix drive shaft within the tubular member.

In an example, each of the pair of support members is an end cap or a bushing.

In an example, the motor drive includes a drive motor and a gear train driven by the drive motor. The gear train drives the helix drive shaft.

In an example, the actuator assembly further includes one or more roller assemblies to movably support the outer carriage on the outer surface of the tubular member.

In an example, the one or more roller assemblies includes an upper roller assembly and a lower roller assembly. The upper roller assembly is spring biased towards the outer surface of the tubular member.

In another aspect, the present disclosure provides a mirror system for a vehicle. The mirror system includes a base frame, an actuator assembly and a mirror head. The base frame is coupled to the vehicle. The actuator assembly is pivotally coupled to the base frame. The actuator assembly includes a tubular member, an inner carriage, an outer carriage, a helix drive shaft and a motor drive. The tubular member defines a longitudinal axis along its length. The inner carriage is slidably received within the tubular member. The inner carriage includes one or more inner magnets. The outer carriage is movably received on an outer surface of the tubular member. The outer carriage is movable along the longitudinal axis relative to the tubular member. The outer carriage is coupled to the mirror head. The outer carriage includes one or more outer magnets magnetically coupled to the one or more inner magnets of the inner carriage. The helix drive shaft is received within the tubular member. The helix drive shaft is drivably coupled to the inner carriage. The helix drive shaft is configured to translate the inner carriage along the longitudinal axis relative to the tubular member. The motor drive is at least partially received within the tubular member. The motor drive is drivably coupled to the helix drive shaft. The motor drive is configured to rotate the helix drive shaft relative to the tubular member. The mirror head is fixedly coupled to the outer carriage. Upon rotation of the helix drive shaft by the motor drive, the inner carriage translates along the longitudinal axis. As a result, the outer carriage and the mirror head translates along with the inner carriage along the longitudinal axis due to magnetic coupling between the one or more inner magnets and the one or more outer magnets.

In an example, the actuator assembly of the mirror system further includes an anti-rotation feature coupled to the inner carriage to prevent rotation of the inner carriage relative to the tubular member.

In an example, the tubular member of the mirror system has a circular cross-section.

In an example, the tubular member of the mirror system has a non-circular cross-section to prevent rotation of the inner carriage relative to the tubular member.

In an example of the mirror system, each of the one or more inner magnets includes a neodymium magnet or a samarium-cobalt magnet. Further, each of the one or more outer magnets includes a neodymium magnet or a samarium-cobalt magnet.

In an example of the mirror system, the one or more inner magnets include a pair of inner magnets. The one or more outer magnets include a pair of outer magnets. Each of the pair of inner magnets is magnetically coupled to a corresponding outer magnet from the pair of outer magnets.

In an example of the mirror system, the motor drive includes a drive motor and a gear train driven by the drive motor. The gear train drives the helix drive shaft.

In an example, the mirror system further includes one or more roller assemblies to movably support the outer carriage on the outer surface of the tubular member.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number.

FIG. 2A illustrates a schematic sectional side view of an actuator assembly of the mirror system of FIG. 1, in accordance with an aspect of the disclosure;

FIG. 2B illustrates a schematic sectional front view of the actuator assembly of FIG. 2A, in accordance with an aspect of the disclosure;

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the disclosure or the appended claims. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

Figure 1B:
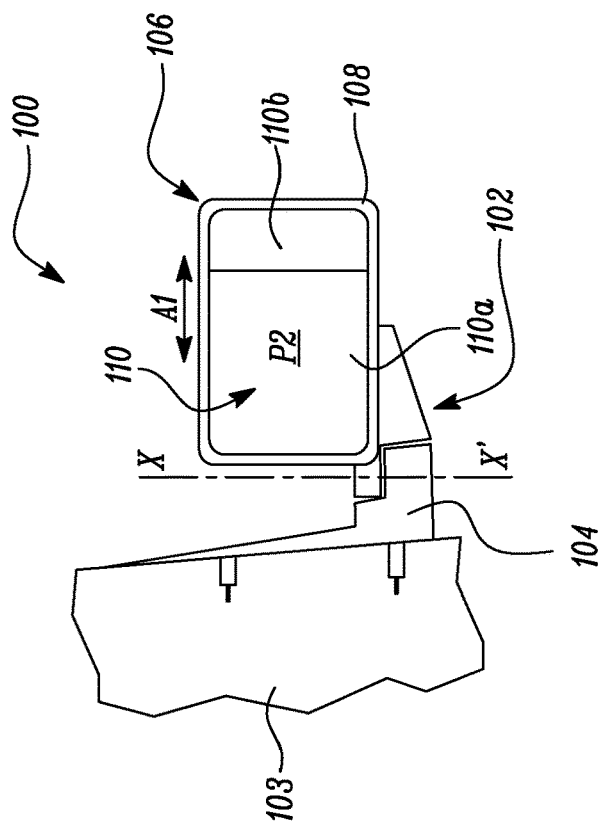
FIGS. 1A and 1B illustrate an example of a mirror system for a vehicle in two different positions, in accordance with an aspect of the disclosure.
Figure 1A:
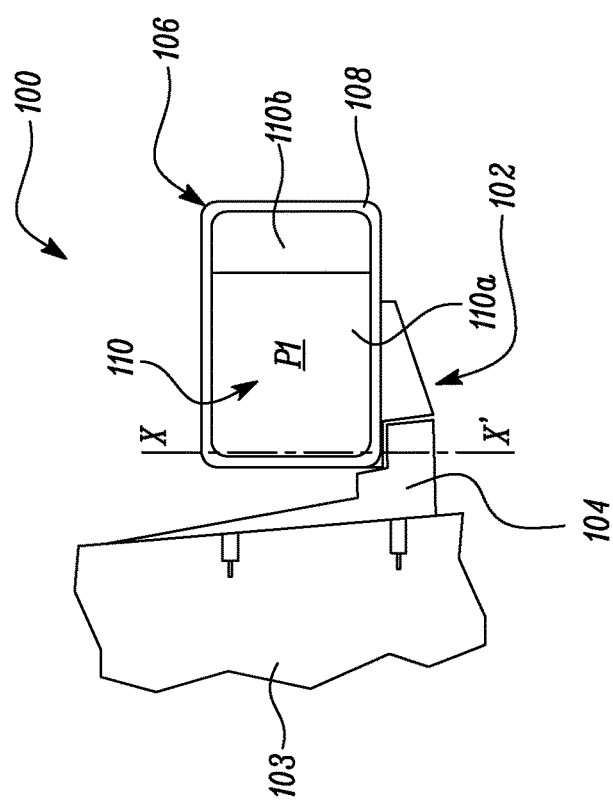

Referring now to the Figures, FIGS. 1A and 1B illustrate an example of a mirror system 100. The mirror system 100 includes a support assembly 102 coupled to a base frame 104 and a mirror head 106 coupled to the support assembly 102. The support assembly 102 adjustably supports the mirror head 106. The base frame 104 is coupled to a body 103, for example, via fasteners. The body 103 may be any part of a vehicle to which the mirror assembly 100 may be attached including a door panel or an A-pillar. The mirror head 106 is adapted to be pivoted about a rotational axis X-X' by either manual or powerfold methods. In the illustrated example of FIGS. 1A-1B, the mirror head 106 has a substantially rectangular shape with rounded edges. However, in other examples, the mirror head 106 may have any suitable shape, such as circular, elliptical, oval, polygonal, etc. The mirror head 106 includes a mirror frame 108 which is adapted to receive a reflective element 110. The mirror frame 108 may be of any desired shape. Further, the reflective element 110 may have any suitable type, such as flat, concave, convex, or a combination thereof. The reflective element 110 includes a primary reflective element 110a and a secondary reflective element 110b. The secondary reflective element 110b may be a convex mirror. The secondary reflective element 110b may act as a blind spot mirror and may allow the mirror to reflect objects from a wider range of angles than is possible with the primary reflective element 110a.

The support assembly 102 enables the mirror head 106 to be adjustable relative to the base frame 104. In some examples, the mirror head 106 can be adjustable manually and/or automatically.

Referring now to FIG. 1A, the mirror head 106 of the mirror system 100 is disposed in a home position P1. In the home position P1, the mirror head 106 can translate away from the base frame 104 by means of the support assembly 102.

FIG. 1B illustrates the mirror head 106 in an extended position P2 after translating away from the base frame 104 in the direction of an arrow A1. In the extended position P2, a distance between the mirror head 106 and the base frame 104 is greater than this distance in the home position P1. Specifically, the extended position P2 is outboard of the home position P1. The terms "inboard" and "outboard" are defined with respect to the base frame 104. In the extended position P2, the mirror head 106 may provide a wider field of view as compared to a field of view in the home position P1. In the extended position P2, the mirror head 106 can move inboard back to the home position P1. Further, the support assembly 102 may restrict the mirror head 106 from further translation away from the base frame 104.

The base frame 104 further includes an actuator assembly 200 which will be described with reference to FIGS. 2-4. The mirror head 106 may reciprocate between the home position P1 and the extended position P2 by the actuator assembly 200. The actuator assembly 200 may be powered by an electrically powered drive and/or moved manually. The reciprocating movement of the mirror head 106 between the home position P1 and the extended position P2 is caused by translational or telescoping movement of the actuator assembly 200.

Referring to FIGS. 2A-2B, a schematic sectional view of the actuator assembly 200 is shown according to an aspect of the present disclosure. The actuator assembly 200 is pivotally coupled to the base frame 104 (shown in FIG. 4A). The actuator assembly 200 includes a tubular member 202, an inner carriage 204, an outer carriage 208, a helix drive shaft 212 and a motor drive 214. The tubular member 202 defines a longitudinal axis LA along its length. Specifically, the tubular member 202 is a thin walled tube connected to the base frame 104 (shown in FIG. 4A) of the mirror system 100. In an example, the tubular member 202 has a circular cross-section (shown in FIG. 3A). The inner carriage 204 is slidably received within the tubular member 202. The inner carriage 204 includes one or more inner magnets 206.

The outer carriage 208 is movably received on an outer surface 202A of the tubular member 202. The outer carriage 208 is fixedly coupled to the mirror head 106 of the mirror system 100. In an example, the outer carriage 208 may be connected to the mirror head 106 by fasteners. The outer carriage 208 is movable along the longitudinal axis LA relative to the tubular member 202. The outer carriage 208 includes one or more outer magnets 210.

The helix drive shaft 212 is received within the tubular member 202. The helix drive shaft 212 extends along the longitudinal axis LA. The helix drive shaft 212 is drivably coupled to the inner carriage 204. Specifically, the helix drive shaft 212 is configured to translate the inner carriage 204 along the longitudinal axis LA relative to the tubular member 202. The motor drive 214 is at least partially received within the tubular member 202. In an example, the motor drive 214 may be a DC motor drive. The motor drive 214 is drivably coupled to the helix drive shaft 212. Specifically, the motor drive 214 is configured to rotate the helix drive shaft 212 relative to the tubular member 202. The helix drive shaft 212 include one or more helical threads.

Upon rotation of the helix drive shaft 212 by the motor drive 214, the inner carriage 204 translates along the longitudinal axis LA. Consequently, the outer carriage 208 translates along with the inner carriage 204 along the longitudinal axis LA due to magnetic coupling between the one or more inner magnets 206 and the one or more outer magnets 210. In other words, when the motor drive 214 is electrically powered, the helix drive shaft 212 rotates around the longitudinal axis LA. The rotation of the helix drive shaft 212 translates the inner carriage 204 along the longitudinal axis LA. The translational motion of the inner carriage 204 causes the outer carriage 208 to translate along with the inner carriage 204 along the longitudinal axis LA as a result of the magnetic coupling between the one or more inner magnets 206 and the one or more outer magnets 210.

As shown in FIGS. 2A-2B, the motor drive 214 includes a drive motor 216 and a gear train 218. The gear train 218 is driven by the electric drive motor 216. The gear train 218 further drives the helix drive shaft 212. In an example, the gear train 218 includes a planetary gear reduction module. The planetary gear reduction module can reduce an input speed for a requirement of a slower output speed.

Referring again to FIG. 2A, the actuator assembly 200 further includes an anti-rotation feature 220 within the tubular member 202. The anti-rotation feature 220 is coupled to the inner carriage 204 to prevent rotation of the inner carriage 204 relative to the tubular member 202. In an example, the anti-rotation feature 220 may be a cylindrical bar with a circular cross-section that extends within the tubular member 202 along the longitudinal axis LA. Alternatively, to prevent the rotation of the inner carriage 204 relative to the tubular member 202, various shapes of the inner carriage 204 may be provided that are of non-circular cross-section. In another example, the tubular member 202 has a non-circular cross-section to prevent the rotation of the inner carriage 204 relative to the tubular member 202. The tubular member 202 may have a rectangular, an oval or a polygonal cross-section.

In the actuator assembly shown in FIG. 2A, the one or more inner magnets 206 include a pair of inner magnets 206. Similarly, the one or more outer magnets 210 include a pair of outer magnets 210. In an example, there may be more than one pair of inner magnets 206 associated with the inner carriage 204 and more than one pair of outer magnets 210 associated with the outer carriage 208. Each of the inner magnet 206 from the pair of inner magnets 206 is magnetically coupled to a corresponding outer magnet 210 from the pair of outer magnets 210.

Each of the one or more inner magnets 206 includes a neodymium magnet or a samarium-cobalt magnet. Each of the one or more outer magnets 210 includes a neodymium magnet or a samarium-cobalt magnet. Both the inner magnets 206 as well as outer magnets 210 may be permanent magnets made from alloys of rare-earth elements. In an example, the rare earth inner magnets 206 and/or the rare earth outer magnets 210 may be replaced with electromagnetic coils (not shown). Such a configuration may allow for higher magnetic force attraction, and consequently higher available drive forces. Further by including electromagnetic coils, there may be little or no magnetic resistance to manually translate the outer carriage 208 or mirror head 106 when the electric current is off. The magnetic attractive force may only be present during the electrical activation cycle of the motor drive 214.

The actuator assembly 200 further includes a pair of support members 222 that rotatably support the helix drive shaft 212 within the tubular member 202. In an example, each of the support members 222 is an end cap or a bushing. Each support member 222 may be made of stabilized polymers, fibre-wound composites, machined metals or combination thereof.

Figure 3A:
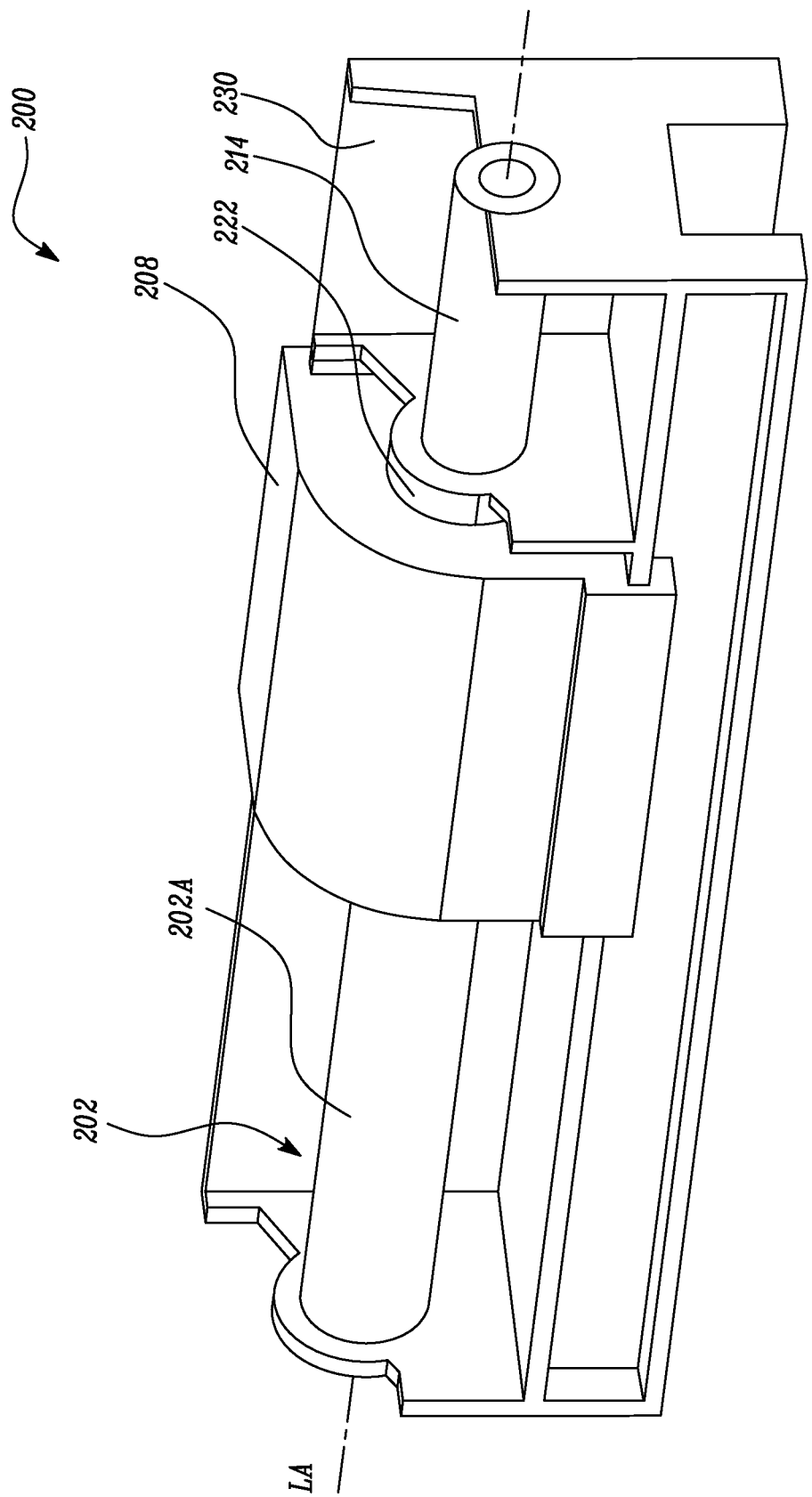
FIG. 3A illustrates a sectional perspective view of the actuator assembly of the mirror system of FIG. 1, in accordance with an aspect of the disclosure.
Figure 3B:
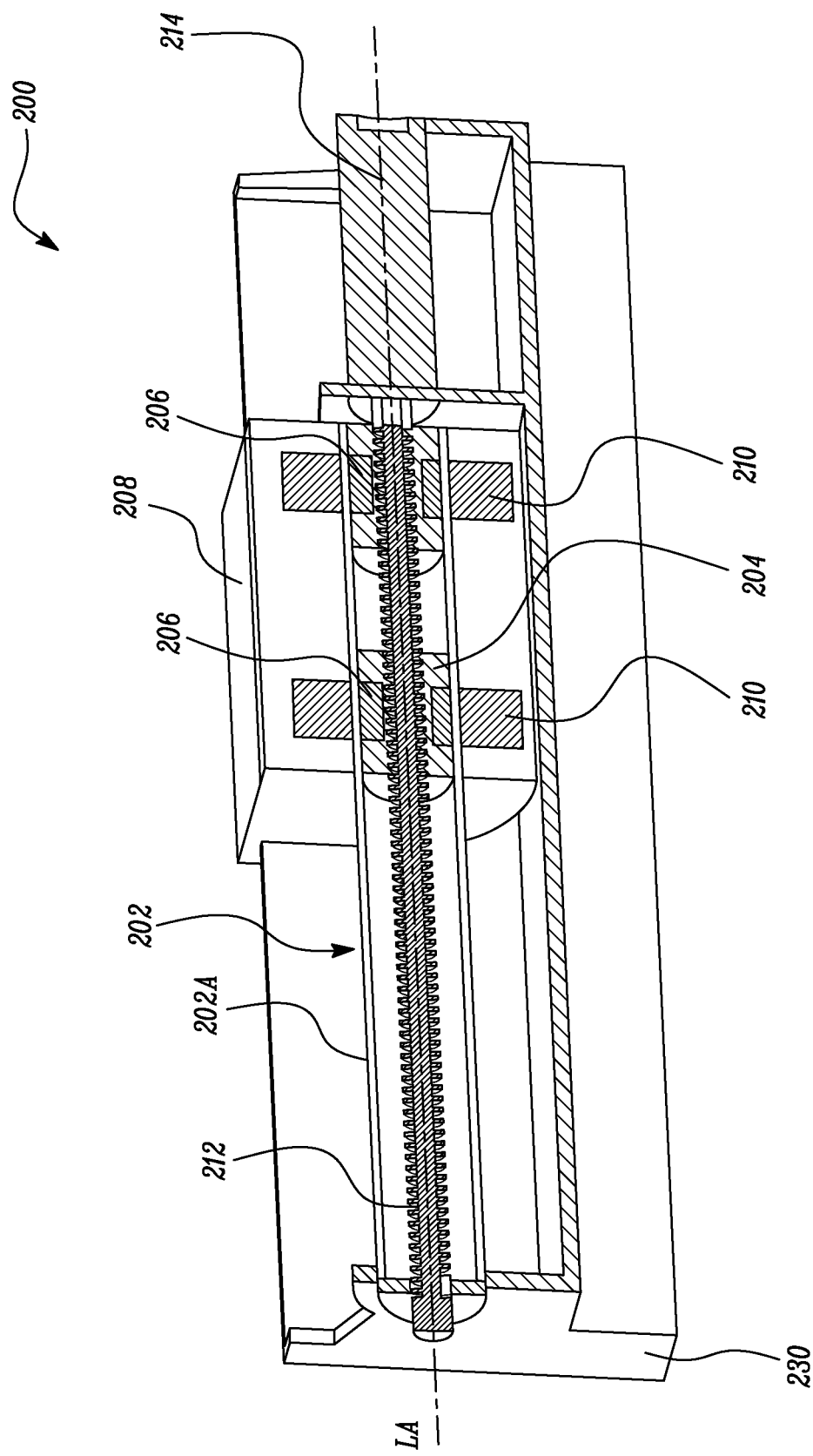
FIG. 3B illustrates a cut-away sectional view of the actuator assembly of FIG. 3A, in accordance with an aspect of the disclosure.

Referring to FIG. 3A, a perspective sectional view of the actuator assembly 200 shows the tubular member 202, the outer carriage 208 and the motor drive 214. The tubular member 202 and the outer carriage 208 are supported by an arm 230. The outer carriage 208 is slidable relative to the arm 230. Referring to FIG. 3B, a cut-away sectional view of the actuator assembly 200 shows the tubular member 202, the inner carriage 204, the inner magnets 206, the outer carriage 208, the outer magnets 210, the helix drive shaft 212 and the motor drive 214.

Figure 4B:
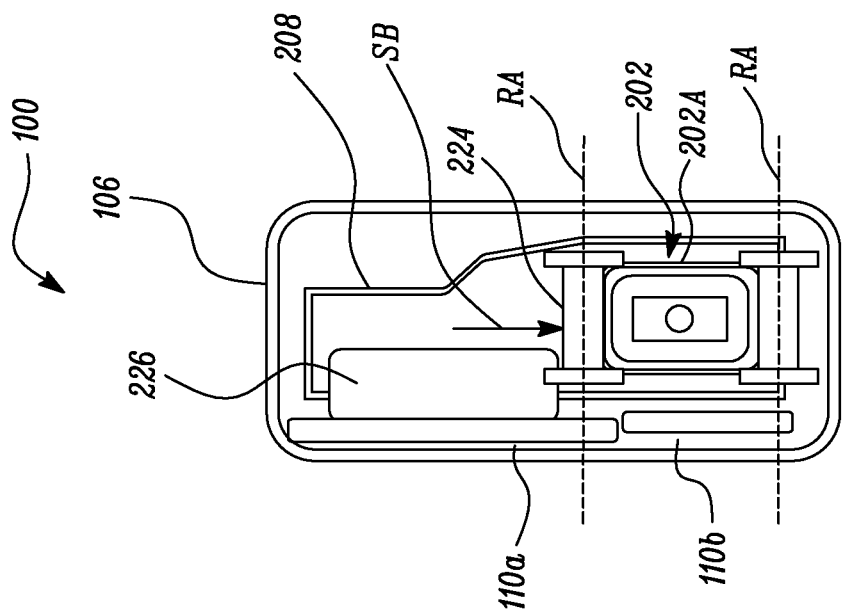
FIG. 4B illustrates a schematic sectional front view of the mirror system of FIG. 4A, in accordance with an aspect of the disclosure.
Figure 4A:
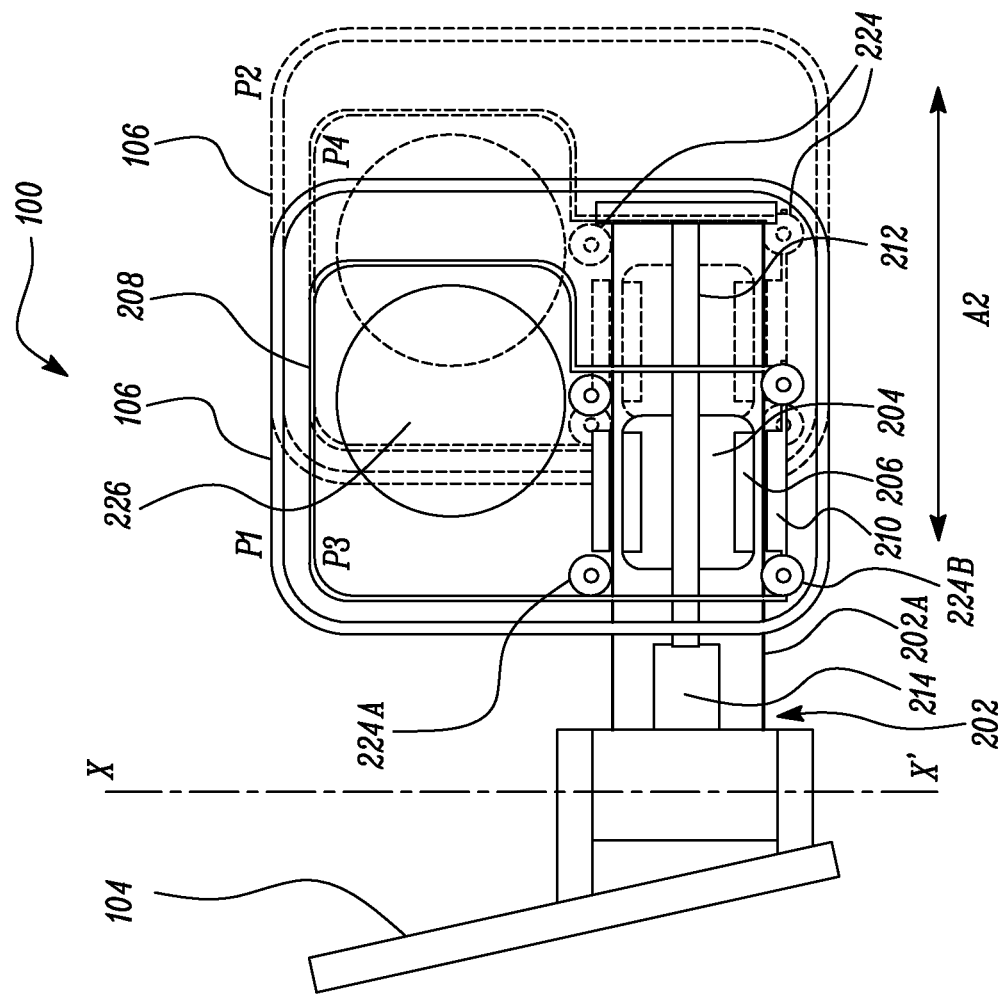
FIG. 4A illustrates a schematic sectional side view of the mirror system of FIG. 1, in accordance with an aspect of the disclosure.

In FIG. 4A, a sectional side view of the mirror system 100 including the actuator assembly 200 is illustrated. As shown in FIG. 4A, a solid outline for the mirror head 106 indicates the home position P1 of the mirror head 106 and a dotted outline for the mirror head 106 indicates the extended position P2 of the mirror head 106. Similarly, a solid line for the outer carriage 208 indicates a home position P3 of the outer carriage 208 and a dotted line for the outer carriage 208 indicates an extended position P4 of the outer carriage 208. Once the drive motor 216 is electrically powered, the helix drive shaft 212 rotates and the inner carriage 204 translates. The translational movement of the inner carriage 204 causes the outer carriage 208 to translate due to magnetic coupling between the inner magnets 206 and the outer magnets 210. As the outer carriage 208 is coupled to the mirror head 106, the mirror head also translates in a telescoping direction A2 shown in FIG. 4A. Specifically, the mirror head 106 translates in the telescoping direction A2 between the home position P1 and the extended position P2.

Referring again to FIG. 4A, the actuator assembly 200 further includes one or more roller assemblies 224. The one or more roller assemblies 224 movably support the outer carriage 208 on the outer surface 202A of the tubular member 202. The roller assemblies 224 are positioned within the mirror head 106 and outside the tubular member 202. The roller assemblies 224 also translate along the length of the tubular member 202 when the outer carriage translates between the home position P3 and the extended position P4.

Furthermore, the one or more roller assemblies 224 includes an upper roller assembly 224A and a lower roller assembly 224B. The upper roller assembly 224A is spring biased towards the outer surface 202A of the tubular member 202. The spring bias of the upper roller assembly 224A is shown schematically by an arrow SB.

With reference to FIG. 4B, the mirror head 106 further includes the primary reflective element 110a, the secondary reflective element 110b and a glass actuator 226. The secondary reflective element 110b may be a spotter glass. The secondary reflective element 110b may be a convex reflector having a substantially spherical surface. The secondary reflective element 110b may allow the mirror to reflect objects from a wider range of angles than is possible with the primary reflective element 110a. The glass actuator 226 is coupled to the primary reflective element 110a and the outer carriage 208. The glass actuator 226 may allow pivotal adjustment of the primary reflective element 110a relative to the mirror head 106. Specifically, the glass actuator 226 may be connected to the primary reflective element 110a and the outer carriage 208 by fasteners. As shown in FIG. 4B, each roller assembly 224 includes a central portion and two peripheral flange portions. Each of the roller assemblies 224 can rotate about a corresponding roller axis RA.

The actuator assembly 200 of the mirror head 106 allows electrical as well as manual telescoping action of the mirror head 106. The present disclosure may allow most of the weight of the mirror system 100 to move from the mirror head 106 to the tubular member 202 of the actuator assembly 200. Specifically, the presence of the motor drive 214 within the tubular member 202 may shift the centre of gravity of the mirror system 100 inboard closer to the vehicle. This inboard shift in the centre of gravity of the mirror system 100 may improve the overall mirror performance. Also, since the drive motor 216, the inner magnets 206, the outer magnets 210 and the helix drive shaft 212 are fully enclosed inside the tubular member 202, these drive components may be isolated from any kind of damaging dirt or debris. Further, the magnetic coupling between the inner magnets 206 and the outer magnets 210 may be smoother, quieter and more durable than slip-nut type assemblies used in conventional mirror actuators. The disclosed actuator assembly 200 may also be used in a power-fold mirror system.

Furthermore, the disclosed actuator assembly 200 includes a holding or detent position between the inner carriage 204 and the outer carriage 208 through the magnetic attraction created by the use of rare earth magnets 206, 210. Once this holding/detent position is overcome through manual articulation, the mirror head 106 is free to telescope linearly under its own sliding efforts without any effect by the actuator assembly 200. Moreover, the disclosed actuator assembly 200 can also be powered from/to any position to recapture the mirror head 106 magnetically and return it to powered electrical control regardless of the telescoped start position of the mirror head 106. Further, in this disclosure, there is no direct connection between the tubular member 202 and the mirror head 106. The power is transferred via the magnetic attraction between the inner carriage 204 and the outer carriage 208. Such power transmission may result in a quieter, smoother mirror telescoping operation.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

LIST OF NUMBERS

100 Mirror System
102 Support Assembly
103 Body
104 Base Frame
106 Mirror Head
108 Mirror Frame 110 Reflective Element
110a Primary Reflective Element
110b Secondary Reflective Element
P1 Home Position
P2 Extended Position
P3 Home Position
P4 Extended Position
X-X' Rotational axis
200 Actuator assembly
202 Tubular member
202A Outer surface
LA Longitudinal axis
204 Inner carriage
206 Inner magnets
208 Outer carriage
210 Outer magnets
212 Helix drive
214 Motor drive
216 Motor
218 Gear train
220 Anti-rotation feature
222 Support member
224 Roller assemblies
224A Upper roller assembly
224B Lower roller assembly
226 Glass actuator
230 Arm
RA Roller Axis
A1 Arrow
A2 Telescoping direction
SB Spring Bias

The invention claimed is:

1. An actuator assembly for a mirror head, comprising:
a tubular member defining a longitudinal axis along its length;
an inner carriage slidably received within the tubular member, the inner carriage comprising one or more inner magnets;
an outer carriage movably received on an outer surface of the tubular member and coupled to the mirror head, wherein the outer carriage is movable along the longitudinal axis relative to the tubular member, the outer carriage comprising one or more outer magnets magnetically coupled to the one or more inner magnets of the inner carriage;
a helix drive shaft received within the tubular member and drivably coupled to the inner carriage, wherein the helix drive shaft is configured to translate the inner carriage along the longitudinal axis relative to the tubular member; and
a motor drive at least partially received within the tubular member and drivably coupled to the helix drive shaft, wherein the motor drive is configured to rotate the helix drive shaft relative to the tubular member;
wherein, upon rotation of the helix drive shaft by the motor drive, the inner carriage translates along the longitudinal axis, and wherein the outer carriage translates along with the inner carriage along the longitudinal axis due to magnetic coupling between the one or more inner magnets and the one or more outer magnets.

2. The actuator assembly of claim 1, further comprising an anti-rotation feature coupled to the inner carriage to prevent rotation of the inner carriage relative to the tubular member.

3. The actuator assembly of claim 2, wherein the tubular member has a circular cross-section.

4. The actuator assembly of claim 1, wherein the tubular member has a non-circular cross-section to prevent rotation of the inner carriage relative to the tubular member.

5. The actuator assembly of claim 1, wherein each of the one or more inner magnets comprises a neodymium magnet or a samarium-cobalt magnet.

6. The actuator assembly of claim 1, wherein each of the one or more outer magnets comprises a neodymium magnet or a samarium-cobalt magnet.

7. The actuator assembly of claim 1, wherein the one or more inner magnets comprise a pair of inner magnets, wherein the one or more outer magnets comprise a pair of outer magnets, and wherein each of the pair of inner magnets is magnetically coupled to a corresponding outer magnet from the pair of outer magnets.

8. The actuator assembly of claim 1, further comprising a pair of support members that rotatably support the helix drive shaft within the tubular member.

9. The actuator assembly of claim 8, wherein each of the pair of support members is an end cap or a bushing.

10. The actuator assembly of claim 1, wherein the motor drive comprises a drive motor and a gear train driven by the drive motor, and wherein the gear train drives the helix drive shaft.

11. The actuator assembly of claim 1, further comprises one or more roller assemblies to movably support the outer carriage on the outer surface of the tubular member.

12. The actuator assembly of claim 11, wherein the one or more roller assemblies comprises an upper roller assembly and a lower roller assembly, wherein the upper roller assembly is spring biased towards the outer surface of the tubular member.

13. A mirror system for a vehicle, comprising:
a base frame coupled to the vehicle;
an actuator assembly pivotally coupled to the base frame, the actuator assembly comprising:
a tubular member defining a longitudinal axis along its length;
an inner carriage slidably received within the tubular member, the inner carriage comprising one or more inner magnets;
an outer carriage movably received on an outer surface of the tubular member and coupled to the mirror head, wherein the outer carriage is movable along the longitudinal axis relative to the tubular member, the outer carriage comprising one or more outer magnets magnetically coupled to the one or more inner magnets of the inner carriage;
a helix drive shaft received within the tubular member and drivably coupled to the inner carriage, wherein the helix drive shaft is configured to translate the inner carriage along the longitudinal axis relative to the tubular member; and
a motor drive at least partially received within the tubular member and drivably coupled to the helix drive shaft, wherein the motor drive is configured to rotate the helix drive shaft relative to the tubular member; and
a mirror head fixedly coupled to the outer carriage;
wherein, upon rotation of the helix drive shaft by the motor drive, the inner carriage translates along the longitudinal axis, and wherein the outer carriage and the mirror head translates along with the inner carriage along the longitudinal axis due to magnetic coupling between the one or more inner magnets and the one or more outer magnets.

14. The mirror system of claim 13, wherein the actuator assembly further comprises an anti-rotation feature coupled to the inner carriage to prevent rotation of the inner carriage relative to the tubular member.

15. The mirror system of claim 14, wherein the tubular member has a circular cross-section.

16. The mirror system of claim 13, wherein the tubular member has a non-circular cross-section to prevent rotation of the inner carriage relative to the tubular member.

17. The mirror system of claim 13, wherein each of the one or more inner magnets comprises a neodymium magnet or a samarium-cobalt magnet, and wherein each of the one or more outer magnets comprises a neodymium magnet or a samarium-cobalt magnet.

18. The mirror system of claim 13, wherein the one or more inner magnets comprise a pair of inner magnets, wherein the one or more outer magnets comprise a pair of outer magnets, and wherein each of the pair of inner magnets is magnetically coupled to a corresponding outer magnet from the pair of outer magnets.

19. The mirror system of claim 13, wherein the motor drive comprises a drive motor and a gear train driven by the drive motor, and wherein the gear train drives the helix drive shaft.

20. The mirror system of claim 13, further comprises one or more roller assemblies to movably support the outer carriage on the outer surface of the tubular member.

* * * * *